3,488,258
METHOD OF RESOLVING RACEMIC STEROIDS
George Greenspan, Merion, Pa., Leland L. Smith, Galveston, Tex., and Richard W. Rees, Newton Square, Pa., assignors to American Home Products Corporation, New York, N.Y., a corporation of Delaware
No Drawing. Continuation-in-part of application Ser. No. 358,083, Apr. 7, 1964, which is a continuation-in-part of application Ser. No. 297,707, July 25, 1963. This application Oct. 7, 1966, Ser. No. 607,035
(Filed under Rule 47(a) and 35 U.S.C. 116)
Int. Cl. C12d 13/02; C12b 1/00
U.S. Cl. 195—51
15 Claims

ABSTRACT OF THE DISCLOSURE

This invention concerns a method of producing natural configuration 17-ketogona-1,3,5(10)-trienes from the corresponding 17β-hydroxygona-1,3,5(10)trienes by oxidation with a microorganism of the genus Corynebacterium. Further, it relates to a process for resolving racemic steroids.

This invention is a continuation-in-part of co-pending application Ser. No. 358,083, filed on Apr. 7, 1964 which application is now abandoned was a continuation-in-part of Ser. No. 297,707, filed on July 25, 1963 and now abandoned.

This invention relates to a process for resolving racemic steroids and more particularly relates to the method of producing steroids having natural configuration from racemic mixtures of the same.

It has now been found according to the method of the present invention that microbiological oxidation of particular racemic steroids can be effected in a manner that will produce from the racemic mixture specific steroids having so-called natural configuration. Natural configuration as used herein means that the molecule has the same absolute configuration as the analogous steroids found in nature and will rotate a beam of polarized light in the same direction as the naturally occurring steroids as determined by conventional test procedure.

More particularly, it has been found according to the present invention that microbiological oxidation carried out on 17-hydroxygona-1,3,5(10)-trienes results in a transformation of the 17β-hydroxyl group to a 17-keto group. The resulting steroid on separation and recovery will have a positive rotation. This microbiological oxidation is accomplished by the fermentation of a racemic steroid substrate generally corresponding to the configuration of Formula I and its mirror image below, utilizing microorganisms of the family Corynebacteriaceae. This resolution is illustrated as shown below:

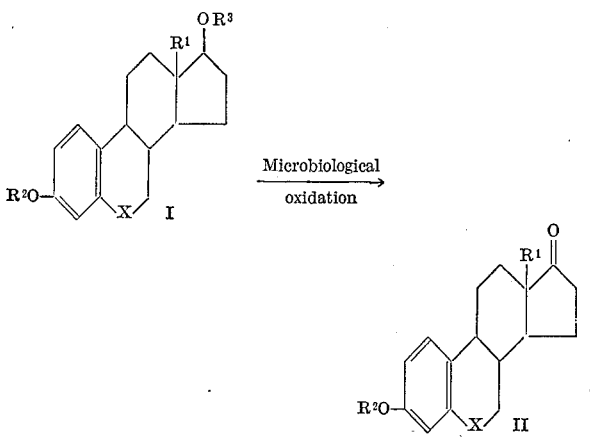

In the foregoing formulae, $R^1$ is lower alkyl; $R^2$ is selected from the group consisting of hydrogen, lower alkyl, lower acyl, aryl, lower alkenyl, lower alkynyl, and cycloalkyl; $R^3$ represents hydrogen or lower acyl; and X is selected from the group consisting of oxygen and methylene. The foregoing lower acyl ($R^2$, $R^3$) includes the acyl radicals derived from the lower molecular weight monocarboxylic acids having less than 10 carbon atoms, which may be in straight, branched or cyclic configuration. While the series of gona-1,3,5(10)-trienes represented by Formula I is suitable for purposes of the present invention, the starting materials preferred are those which contain a 17β-hydroxyl group. The compounds encompassed within Formula I wherein X is methylene are prepared according to the method described in copending application Ser. No. 228,384, filed Oct. 4, 1962 and Belgian Patents 608,370 and 608,369 and patents cited therein. Alternatively the compounds encompassed within Formula I wherein X is oxygen are prepared according to the method described in copending application Ser. No. 483,528, filed Aug. 30, 1965.

The product II is a resolved derivative of the racemic starting material I, which has the d-configuration, that is, the same configuration as is found in naturally occurring steroids.

In order to effect the conversion of the 17β-hydroxyl group to the 17-keto group, it is necessary, as has been suggested, that the substrate containing the racemic mixture of steroids encompassed within those defined by Formula I be incubated with strains of a microorganism of the genus Corynebacterium. Typical of the species of Corynebacterium which are useful for purposes of the present invention are C. simplex (Arthrobacter simplex ATCC 6946), C. hoagii and C. equi.

The desired growth of the selected microorganism of Corynebacterium, utilized in the process of this invention, is accomplished in a suitable nutrient medium containing carbohydrate, organic nitrogen and inorganic salts in accordance with well-known technique. The racemic steroid starting material is then dissolved or suspended in a solvent such as ethanol, acetone or any other water-miscible solvent which is non-toxic toward the organism, and added to the cultivated microorganism in a broth medium under sterile conditions. This culture is then shaken, aerated or simultaneously aerated and agitated, in order to enhance the growth of the microorganism and the biochemical conversion of the steroid substrate. The steroid may be added to the culture medium followed by inoculation with the bacterium. In certain cases, depending on the conditions of the reaction medium, it may be more desirable to obtain optimum growth of the microorganism before the addition of the steroid.

A useful method for carrying out the process of the present invention is the cultivation of the selected microorganism in a suitable nutrient medium under aerobic conditions. A suitable volume of the cell suspension is then seeded into nutrient medium of the same or altered composition for supporting growth of the microorganism. The nutrient medium employed may be a yeast extract-dextrose medium, casein hydrolysate, corn steep liquor, water extract of soybean oil meal or lactalbumin hydrolysate together with an appropriate carbon source.

The addition of inorganic salts may be desirable to maintain a pH level in the reaction medium of between 6.8 and 7.2. If the use of inorganic salts for buffering the reaction mixture is omitted, a pH rise from an initial value of 6.8 to about 7.7–8 may be noted. The optimum temperature for growth of the selected microorganism is 28° C., but the temperature may vary between 25° and 37° C., and even between 20° and 40° C. without adversely affecting the microorganism, if the higher temperature is not maintained over long periods of time.

The time of reaction may vary from as little as 3 hours to as much as 120 hours and will depend on the steroid being treated. Any water miscible, nontoxic (to the organism) solvent may be employed to dissolve or suspend the steroid. Preferable solvents are ethanol and acetone either of which may be used in such amounts that the final concentration of these solvents in the reaction mixture is no higher than about 7% and may amount to only traces; owing to evaporation, the final concentration of the organic solvent may be substantially zero.

Recovery of the desired product is accomplished by extraction with a suitable water immiscible solvent followed by filtration, absorption or other of the commonly used procedures practiced in the art of steroid recovery including chromatography, fractional crystallization, counter-current distribution and the like. If extraction is used to recover the steroid product, chlorinated lower hydrocarbons, ketones or alcohols may be used. Included within these solvents would be chloroform, methylene chloride, trichloroethane, ethylene dichloride, butanol, diethylketone, methyl isobutyl ketone and the like. For purposes of the present invention, recovery of the desired steroid following conversion is preferably by the extraction method.

As has been suggested, the 17-keto steroids obtained produce a strong positive rotation, thus making these products particularly suitable for use in the synthesis and recovery of resolved steroids having biological activity of recognized and known utility. For example, the compounds encompassed within those identified by Formula II above may be reduced by lithium and ammonia to produce the Δ4-3-ketones such as are shown at III which are useful for their androgenic properties. Compounds of Formula IV may then be prepared from III by oxidation of the 17-hydroxyl group.

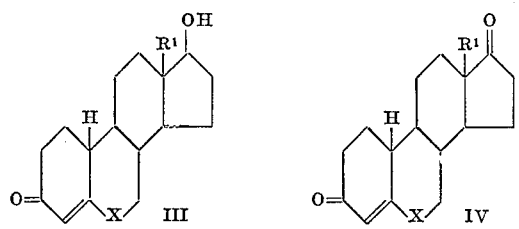

Compounds of Formula IV are also useful as androgenic hormones.

In the foregoing formulae, $R^1$ represents the substituents previously described with respect to Formulae I and II above.

A better understanding of the method of the present invention and the manner in which the same may be carried out will be apparent by reference to the examples which follow:

EXAMPLE I

One ml. of a 5 ml. suspension of cells of *Corynebacterium simplex* (*Arthrobacter simplex* ATCC 6946), obtained by washing the surface growth on an agar slant, is transfered to a 250 ml. flask containing 50 ml. of the following medium: yeast extract 1%, dextrose 1%, and distilled $H_2O$ 100 ml.

The flask is incubated on a reciprocating shaker at 28° C. for 24 hours, after which a ten percent transfer is made to a flask of the same medium. This flask is shaken as above for 22.5 hours and then supplemented with a solution of the steroid dl-13β-ethyl-3-methoxygona-1,3,5(10)-trien-17β-ol, (7.5 mg. in 0.5 ml. of ethanol). After 45 hours of incubation, a 5 ml. sample is taken and equilibrated with 1 ml. of methyl isobutyl ketone. The extract is spotted on No. 1 Whatman paper and the papergram run in the heptane/formamide solvent system.

The dried papergram is sprayed with a mixture of equal parts of 1% $FeCl_3$ and 1% $K_3Fe(CN)_6$ solutions. A product positive to Turnbull blue and less polar than the substrate appears. This zone has the mobility of 13β - ethyl - 3 - methoxygona - 1,3,5(10) - trien - 17 - one. An increase in product is observed at 70 hours.

Another experiment was conducted in a manner similar to that of Example I above with variations being made in the reactant quantities and in the manner in which oxidation was carried out. Results of this experiment are set forth in Example II below.

EXAMPLE II

The surface growth of *Corynebacterium simplex* ATCC 6946 on six agar slants is washed with 5 ml. of distilled water per slant. One half of the volume of each suspension is added to each of 12 flasks of the yeast extract-dextrose medium of Example I (200 ml./l. flask). The flasks are incubated on a reciprocating shaker at 28° C. After 24 hours of growth, 10% transfers are made to one and two liter flasks containing 200 and 400 ml. respectively of the above medium. The flasks are shaken as above for 24 hours, before the addition of 4.28 g. of the steroid dl-13β - ethyl - 3 - methoxygona-1,3,5(10)-trien-17β-ol, 40 mg./ml. in ethanol, to give a concentration of 0.2 g./l. The flasks are then placed on rotary shakers at 26° and 28° C. The course of the transformation to the oxidized product is followed daily by paper chromatography. After 120 hours of contact time, the broth is harvested for extraction.

Harvest broth obtained from the fermentation of 4.18 g. of dl-13β-ethyl-3-methoxygona-1,3,5(10)-trien-17β-ol is extracted with ethyl acetate several times and the ethyl acetate extracts combined and reduced in volume under vacuum. The concentrate is filtered and the solid product (1.20 g.), analyzed by thin-layer chromatography, shown to be a mixture of the desired 17-ketone and unaltered substrate. The mixture is chromatographed on 120 g. of silica gel and eluted with benzene, thus affording the purified 17-ketone product. Recrystallization of the product from acetate-hexane several times gives d-13β-ethyl-3-methoxygona - 1,3,5(10) - trien - 17 - one, M.P. 147–149°; $[\alpha]_D$ +110.9°; $\lambda_{max}$ 278 mμ ($\epsilon$ 2,100), 286 mμ ($\epsilon$ 1,990).

*Analysis.*—Calcd. for $C_{20}H_{26}O_2$: C, 80.49; H, 8.78. Found: C, 80.68; H, 8.67.

EXAMPLE III

The product of Example II, namely, d-13β-ethyl-3-methoxygona-1,3,5(10)-trien-17-one is treated with lithium and ammonia followed by acid hydrolysis to produce d-13β-ethyl-17β-hydroxygon-4-en-3-one.

EXAMPLE IV

Following the procedure of Example II, dl-3-ethoxy-13β - ethylgona - 1,3,5(10) - trien - 17β - ol is treated with *Corynebacterium simplex* to yield d-3-ethoxy-13β-ethylgona-1,3,5(10)-trien-17-one.

The term treating as used herein with respect to the action of *C. simplex* in the present invention is intended to encompass fermentation.

EXAMPLE V

Following the procedure of Example II, dl-13β-butyl-3 - methoxygona - 1,3,5(10) - trien - 17β - ol is treated with *Corynebacterium simplex* to yield d-13β-butyl-3-methoxygona-1,3,5(10)-trien-17-one.

EXAMPLE VI

Following the procedure of Example II, dl-3-methoxy-13β-isopropylgona-1,3,5(10)-trien-17β-ol is treated with *Corynebacterium simplex* to yield d-3-methoxy-13β-isopropylgona-1,3,5(10)-trien-17-one.

EXAMPLE VII

Following the procedure of Example II, dl-13β-isobutyl-3-pentoxygona-1,3,5(10)-trien-17β-ol is treated with *Corynebacterium simplex* to yield d-13β-isobutyl-3-pentoxygona-1,3,5(10)-trien-17-one.

EXAMPLE VIII

Following the procedure of Example II, racemic 3-cyclohexyloxy - 13β - ethylgona - 1,3,5(10) - trien - 17β - ol is treated with *Corynebacterium simplex* to yield *d*-3-cyclohexyloxy-13β-ethylgona-1,3,5(10)-trien-17-one.

EXAMPLE IX

By means of the procedure of Example II, racemic 3-acetoxy - 13β-ethylgona - 1,3,5(10) - trien - 17β - ol is treated with *Corynebacterium simplex,* yielding *d*-3-acetoxy-13β-ethylgona-1,3,5(10)-trien-17-one.

EXAMPLE X

Following the procedure of Example II, racemic 13β-ethyl-3-phenoxygona-1,3,5(10)-trien-17β-ol is treated with *Corynebacterium simplex* to produce *d*-13β-ethyl-3-phenoxygona-1,3,5(10)-trien-17-one.

EXAMPLE XI

Following the procedure of Example II, racemic 3-allyloxy - 13β - ethylgona - 1,3,5(10) - trien - 17β - ol is treated with *Corynebacterium simplex* to yield *d*-3-allyloxy-13β-ethylgona-1,3,5(10)-trien-17-one.

EXAMPLE XII

Following the procedure of Example II, racemic 13β-ethyl - 3 - propyloxygona - 1,3,5(10) - trien - 17β - ol is treated with *Corynebacterium simplex* to yield *d*-13β-ethyl-3-propyloxygona-1,3,5(10)-trien-17-one.

EXAMPLE XIII

Two agar slants with surface growth of *Corynebacterium hoagii* ATCC 7005 are each washed with 5 ml. of distilled water. The suspensions obtained are utilized to inoculate two one l. flasks containing 0.1% yeast extract solution. Incubation of the flasks is carried out on a reciprocating shaker at 28° C. Following 24 hours of shaking, 10% transfers are made to five two l. flasks and two one l. flasks with 400 ml. and 200 ml. respectively of a 0.1% yeast extract solution. Incubation is continued as above for 23 hours before the addition of 475 mg. of *dl*-estradiol methyl ether, as a solution of 20 mg./ml. of ethanol, to give a concentration of 0.2 g./l. The flasks are shaken for 72 hours before harvest.

The broth, in which 459 mg. of *dl*-estradiol methyl ether has been fermented, is extracted six times with 300 ml. volumes of CHCl$_3$ and the CHCl$_3$ extracts combined. The organic extracts are washed with water and brine, and dried over sodium sulphate, and evaporated. The residue (0.40 g.) in benzene-hexane (1:4) (10 ml.) is chromatographed on neutral deactivated alumina (Woelm activity III) (14 g.). Elution with benzene-hexane (1:4) (220 ml.) and recrystallization of the product from methanol gives *d*-estrone methyl ether (0.14 g.), M.P. 158–169° C., $[\alpha]_D^{22.5}$ +138.1° (1% in CHCl$_3$).

Further elution with benzene-hexane (3:7) (100 ml.), benzene-hexane (1:1) (60 ml.) and benzene (100 ml.) then affords *l*-estradiol methyl ether (0.145 g.). Recrystallization from ether-hexane gives 0.13 g., M.P. 99–107° C., $[\alpha]_D^{22.5}$ −71.1° (1% in CHCl$_3$).

EXAMPLE XIV

Two agar slants with surface growth of *Corynebacterium simplex* ATCC 6946 are each washed with 5 ml. of distilled water. One half of the volume of each suspension is added to each of four 500 ml. Erlenmeyer flasks containing 100 ml. each of a 0.1% yeast extract solution. The flasks are incubated on a reciprocating shaker at 28° C. After 24 hours of growth, 10% transfers are made to each of six 2 l. flasks with 400 ml. each of 0.1% yeast extract solution. The flasks are shaken for 18.5 hours as above, before the addition to each flask of 80 mg. of *dl*-estradiol methyl ether (*dl*-3-methoxyestra-1,3,5(10)-triene-17β-ol) as a solution of 20 mg./ml. of ethanol to give a concentration of 0.2 g./l. The flasks are incubated on a rotary shaker, 250 r.p.m., at 28° C. for 54 hours before harvest.

The harvest broth, in which 468 mg. of *dl*-3-methoxyestra-1,3,5(10)-triene-17β-ol has been fermented, is extracted six times with 300 ml. volumes of CHCl$_3$. The combined chloroform extracts are washed with 250 ml. of distilled water followed by washing with brine (250 ml.), dried over sodium sulphate and evaporated. The residue (0.472 g.) is dissolved in benzene (2 ml.), diluted with hexane (2 ml.) and adsorbed on neutral deactivated alumina (Woelm, activity III), (17 g.). Elution with benzene-hexane (1:4) (125 ml.) and benzene-hexane (3:7) (100 ml.) gives a solid (0.147 g.) which on recrystallization from methanol affords *d*-estrone methyl ether (0.126 g.), M.P. 169–170° C., $[\alpha]_D^{24}$+159.4° (1% in CHCl$_3$).

Further elution with benzene-hexane (3:7) (150 ml.), benzene-hexane (2:3) (100 ml.), benzene-hexane (1:1) (75 ml.) and benzene (50 ml.) affords crude estradiol methyl ether (0.198 g.). A sample recrystallized from ether-hexane has a M.P. 135–136° C. $[\alpha]_D^{24}$−8.3° (1% in CHCl$_3$).

EXAMPLE XV

By means of the procedure of Example II, racemic 13β-ethylgona - 1,3,5(10) - triene - 3,17β - diol is treated with *Corynebacterium simplex* to yield *d*-13β-ethyl-3-hydroxygona-1,3,5(10)-trien-17-one.

EXAMPLE XVI

Nine agar slants of *Corynebacterium hoagii* ATCC 7005 are each washed with 5 ml. of distilled water. The suspensions are transferred to nine one liter Erlenmeyer flasks containing 200 ml. of 0.1% yeast extract solution. The flasks are incubated on a rotary shaker, 28° C., 250 r.p.m. 2″ diameter of rotation for 22 hours. Forty mg. of *dl*-6-oxa-estradiol methyl ether, dissolved in 2 ml. of ethanol, is added to each of eight flasks; 20 mg. in one ml. of solution is added to the ninth flask. Incubation is carried out on the reciprocating shaker, 3⅝″ stroke, 83 strokes/min., at 28° C.

The flasks are harvested at 54 hours and the fermentation mixture then extracted exhaustively with ethyl acetate. At this time, the aqueous layer is found by paper chromatography to contain negligible steroidal material. The combined extracts are washed with saturated brine, dried over anhydrous sodium sulfate and evaporated to leave a solid residue. This residue, in benzene (5 ml.), is absorbed on neutral Woelm alumina (activity II) (10.0 g.). The column is prepared using benzene and elution commenced with the same solvent. Elution with benzene (100 ml.) gives a pale yellow gum (0.1 g.) which is discarded. Further elution with benzene (300 ml.) affords *d*-3-methoxy-13β-methyl-6-oxagona - 1,3,5(10) - trien-17-one. Recrystallization from methanol yields 0.050 g.; M.P. 118–121° C., $[\alpha]_D^{24}$+104° (c., 1.0 in CHCl$_3$). This material shows one spot by thin layer chromatography on Silica Gel G. (250μ), using ethyl acetate-hexane (1:1) as the moving phase.

Further elution with benzene-ether (99:1) yields a crystalline material that is found to be the starting material (0.045 g.), while *l*-3-methoxy-13β-methyl-6-oxagona-1,3,5(10)-trien-17β-ol is finally eluted from the column with benzene-ether (9:1). Recrystallization from isopropanol yields 0.045 g. M.P. 113–120° C., $[\alpha]_D^{25}$−50° (c., 1.0 in CHCl$_3$). This material gives one spot by thin layer chromatography using the system described above.

The aforesaid procedure is repeated using *Corynebacterium simplex* with similar results.

EXAMPLE XVII

The product of Example XVI, *d*-3-methoxy-13-methyl-6-oxagona-1,3,5(10)-trien-17-one is treated with lithium and ammonia followed by acid hydrolysis to give *d*-13-methyl-17β-hydroxygon-4-en-3-one.

EXAMPLE XVIII

The procedure of Example XVI is repeated to convert the following 6-oxagona-1,3,5(10)-triene reactants to the hereinafter listed 6-oxagona-1,3,5(10)-trien-17-ones:

| Reactants | Products |
| --- | --- |
| dl-3-ethoxy-13β-ethyl-6-oxagona-1,3,5(10)-trien-17β-ol | d-3-ethoxy-13β-ethyl-6-oxagona-1,3,5(10)-trien-17-one. |
| dl-13β-butyl-3-methoxy-6-oxagona-1,3,5(10)-trien-17β-ol | d-13β-butyl-3-methoxy-6-oxagona-1,3,5(10)-trien-17-one. |
| dl-3-methoxy-13β-isopropyl-6-oxagona-1,3,5(10)-trien-17β-ol | d-3-methoxy-13β-isopropyl-6-oxagona-1,3,5(10)-trien-17-one. |
| dl-13β-isobutyl-3-pentoxy-6-oxagona-1,3,5(10)-trien-17β-ol | d-13β-isobutyl-3-pentoxy-6-oxagona-1,3,5(10)-trien-17-one. |
| dl-3-acetoxy-13β-ethyl-6-oxagona-1,3,5(10)-trien-17β-ol | d-3-acetoxy-13β-ethyl-6-oxagona-1,3,5(10)-trien-17-one. |
| dl-13β-ethyl-3-phenoxy-6-oxagona-1,3,5(10)-trien-17β-ol | d-13β-ethyl-3-phenoxy-6-oxagona-1,3,5(10)-trien-17-one. |
| dl-13β-ethyl-3-propyloxy-6-oxagona-1,3,5(10)-trien-17β-ol | d-13β-ethyl-3-propyloxy-6-oxagona-1,3,5(10)-trien-17-one. |

In the foregoing examples, representative compounds of the present invention have been prepared and described. It is to be understood that the preparation and identification of these specific compounds should in no way be considered a limitation on the scope of this invention. The latter is to be limited only by the claims appended hereto.

The invention claimed is:

1. A method of producing natural configuration 17-ketogonatrienes having the formula:

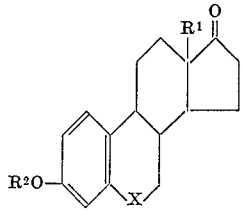

wherein $R^1$ is lower alkyl; $R^2$ is selected from the group consisting of hydrogen,, lower alkyl, lower acyl, aryl, lower alkenyl, lower alkynyl and cycloalkyl; and X is selected from the group consisting of oxygen and methylene which comprises oxidizing a racemic mixture of 17β-hydroxygonatriene of the formula:

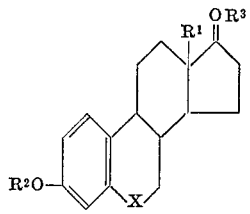

wherein $R^1$ and $R^2$ are defined as above and $R^3$ is selected from the group consisting of hydrogen and lower acyl, with a microorganism of the genus Corynebacterium under oxidizing conditions and recovering a d-17-ketogonatriene steroid.

2. A method as described in claim 1 wherein the microorganism is *Corynebacterium hoagii*.

3. A method as described in claim 1 wherein the microorganism is *Corynebacterium simplex*.

4. A method as described in claim 1 for producing a natural configuration 13β-alkyl-17-ketogona-1,3,5(10)-triene from a racemic mixture of a 13β-alkyl-17β-hydroxygona-1,3,5(10)-triene which comprises oxidizing the racemic mixture with a microorganism of the genus Corynebacterium under oxidizing conditions and recovering a d-13β-alkyl-17-ketogona-1,3,5(10)-triene.

5. A method as described in claim 1 for producing d-13β - ethyl-3-methoxygona-1,3,5(10)-trien-17-one which comprises oxidizing dl-13β-ethyl-3-methoxygona-1,3,5-(10)-trien-17β-ol with a microorganism of the genus Corynebacterium under oxidizing conditions and recovering d-13β-ethyl-3-methoxygona-1,3,5(10)-trien-17-one.

6. A method as described in claim 1 for producing d-3-methoxy - 13β - isopropylgona-1,3,5(10)-trien-17-one which comprises oxidizing dl-3-methoxy-13β-isopropylgona-1,3,5(10)-trien-17β-ol with a microorganism of the genus Corynebacterium under oxidizing conditions and recovering d-3-methoxy - 13β - isopropylgona-1,3,5(10)-trien-17-one.

7. A method as described in claim 1 for producing d-13β-isobutyl - 3 - pentoxygona-1,3,5(10)-trien-17-one which comprises oxidizing dl-13β-isobutyl-3-pentoxygona-1,3,5(10)-trien-17β-ol with *Corynebacterium simplex* under oxidizing conditions and recovering d-13β-isobutyl-3-pentoxygona-1,3,5(10)-trien-17-one.

8. A method as described in claim 1 for producing d-3-methoxy - 13β - methyl-6-oxagona-1,3,5(10)-trien-17-one which comprises oxidizing dl-3-methoxy-13β-methyl-6-oxagona-1,3,5(10)-trien-17β-ol with *Corynebacterium hoagii* under oxidizing conditions and recovering d-3-methoxy-13β-methyl-6-oxagona-1,3,5(10)-trien-17-one.

9. A method as described in claim 1 for producing a d-3-alkoxy - 3β - alkylgona-1,3,5(10)-trien-17-one from a racemic mixture of a 3-alkoxy-13β-alkylgona-1,3,5(10)-trien-17β-ol which comprises oxidizing the racemic mixture with a microorganism of the genus Corynebacterium under oxidizing conditions and recovering a d-3-alkoxy-13β-alkylgona-1,3,5(10)-trien-17-one.

10. A method as described in claim 1 for producing a d-3-alkoxy - 13β - alkyl-6-oxagona-1,3,5(10)-trien-17-one from a racemic mixture of a 3-alkoxy-13β-alkyl-6-oxygona-1,3,5(10)-trien-17β-ol which comprises oxidizing the racemic mixture with a microorganism of the genus Corynebacterium under oxidizing conditions and recovering a d-3-alkoxy-13β-alkyl-6-oxagona-1,3,5(10)-trien-17-one.

11. A method of resolving racemic steroids having the structure:

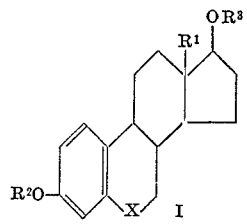

wherein $R^1$ is lower alkyl; $R^2$ is selected from the group consisting of hydrogen, lower alkyl, lower acyl, aryl, lower alkenyl, lower alkynyl and cycloalkyl; $R^3$ is selected from the group consisting of hydrogen and lower acyl; and X is selected from the group consisting of oxygen and methylene, which comprises subjecting a racemic mixture of a steroid of structure I to microbiological oxidation with a microorganism of the genus Corynebacterium and separating the resulting products.

12. A method as described in claim 11 wherein separation of the steroid products is accomplished by chromatography.

13. A method as described in claim 11 for producing d-estrone methyl ether which comprises oxidizing dl-3-methoxyestra-1,3,5(10)-trien-17β-ol with a microorganism of the genus Corynebacterium under oxidizing conditions and recovering d-estrone methyl ether.

14. A method as described in claim 13 wherein the microorganism is *Corynebacterium hoagii*.

15. A method as described in claim 13 wherein the microorganism is *Corynebacterium simplex*.

(References on following page)

References Cited

UNITED STATES PATENTS

| | | | |
|---|---|---|---|
| 2,844,513 | 7/1958 | Wettstein et al. | 195—51 |
| 3,189,528 | 6/1965 | Smith et al. | 195—51 |
| 3,344,038 | 9/1967 | Greenspan et al. | |

ALVIN E. TANENHOLTZ, Primary Examiner

U.S. Cl. X.R.

260—239.55. 397.4